March 29, 1938.  C. J. LEWIT  2,112,674
HEAT PRODUCING COMPOSITION
Filed Dec. 13, 1935

INVENTOR.
CARL J. LEWIT.
BY
ATTORNEY.

Patented Mar. 29, 1938

2,112,674

UNITED STATES PATENT OFFICE 2,112,674

HEAT PRODUCING COMPOSITION

Carl J. Lewit, Atlanta, Ga., assignor to Industrial Development and Research Laboratories, Incorporated, Atlanta, Ga., a corporation of Georgia Application December 13, 1935, Serial No. 54,292

1 Claim. (Cl. 44—3)

This invention relates to the process of producing heat by chemical means and specifically relates to the method whereby heat is generated by a chemical reaction started by a catalytic agent.

The invention particularly relates to the use of a two stage displacement reaction of a type similar to that disclosed in my copending application Serial No. 50,492. In this type of reaction water is used solely as a catalytic agent and does not enter into combination with any of the chemicals involved in the heat liberating reaction.

The invention further relates to the use of a two stage reaction in which heat must be supplied by a primary reaction of two or more chemicals in order to start a secondary reaction, which will liberate more heat or will prolong or intensify the amount and/or degree of heat already liberated.

The invention likewise relates to the use of a catalytic agent, such as water, to start a chemical reaction from which heat is liberated as a result of the oxidation of one or more free metals by one or more salts or other chemical compounds.

A further modified form of the invention is also disclosed wherein a catalytic agent such as water is used to start a two stage heating reaction in which an active metal first reacts with an active chemical thereby releasing sufficient heat to start a reaction between a less active metal and the active chemical.

The heat producing chemical reactions, herein disclosed, may be applied to any useful purpose such as chemical bed heating pads, or similar articles, and are of particular value when used in the hair waving art.

Certain fundamental difficulties present themselves in the present methods of generating heat by chemical means and the invention which forms the subject matter of this application is directed to the elimination of these difficulties.

The chemical reactions now used for generating heat consist of applying water or other liquid to an exothermic chemical which combines directly with the liquid reagent and liberates heat during the period of the reaction. In such a chemical reaction great difficulty is experienced in controlling the amount of heat, the reaction time, the degree of heat, and other important factors. In fact starch, sugar, sand, salt, or other inert and/or active substances, such as ammonium sulphate, are combined with the exothermic material in many of the applications now used in an effort to control the reaction within safe limits.

It will be seen that, since the liquid with which the chemicals are wetted is one of the active substances which goes into combination, in order to get absolutely uniform results, an exact amount of liquid must be used in every case. It is obvious that with the methods now in use such a condition is impossible. In addition to the defects enumerated above, all the chemicals heretofore in use have been, due to their caustic nature, to some degree poisonous and/or harmful in case they are placed in close proximity to the human body.

The chemical reactions disclosed in this invention are of such a nature that the amount and degree of heat liberated is not dependent on the exact amount of liquid present but is the same whether the chemicals have been only dampened or have been thoroughly wetted. In fact the degree of heat to be liberated from a given mixture is determined when the chemicals are mixed in the factory, and is not affected materially by mishandling on the part of the user.

It is important to note, that in all of the mixtures disclosed, water does not take a part chemically in the heat liberating reaction, but acts only as a catalytic agent, or a medium in the presence of which chemical reaction takes place.

The advantages of a chemical, or chemical mixture, which does not require the chemical action of water in order to liberate heat, is apparent. In such a composition no action takes place as the result of the decomposition of water, and therefore, the quantity of water added to the mixture does not materially affect the amount or degree of heat generated. In chemical mixtures where water takes a part in the reaction the heating characteristics depend on the quantity of water added to the mixture. If too small a quantity of water is added to the mixture the heat generating reaction will cease much sooner than when the theoretically correct quantity has been added. If such a mixture contains too large a quantity of water the reaction will not take place normally since the chemicals in the mixture will be diluted by the excess water and control of the reaction even by ionization methods will be ineffectual. The quantity of water necessary in a chemical reaction in which water enters into combination is, in most cases, more than that necessary in a chemical reaction in which water acts only as a catalyst or medium of reaction.

An important advantage of the chemical formulas which form the subject matter of this application results from the fact that since water does not enter into the reaction there is no danger of hydrogen gas escaping from the reaction. In chemical mixtures where water acts as a reagent by combining with a metal, hydrogen is always a product of the reaction. I am aware that attempts have been made to add a depolarizing agent to remove the hydrogen in the chemical reaction just referred to. However, experiments have shown that if too much depolarizing material is added chlorine is given off and if too little is added hydrogen is still given off. It will be seen that in devices such as chemical bed pads or hair waving pads which must be applied by the user or by an inexperienced operator that it is generally impossible to get successful results where a depolarizing agent is used.

It is of course obvious that neither chlorine, or hydrogen in the nascent form, can be used with safety in applications which are applied to the human body, since both of these substances have strong bleaching properties, and the hydrogen is in addition highly explosive when mixed with air.

I have found in the course of my experiments that temperatures of 120 degrees centigrade and even higher can be obtained by chemical mixtures of the types utilized by the present invention.

In the following mixture:

| | Parts |
|---|---|
| Potassium chlorate or perchlorate | 1–10 |
| Magnesium metal | 1–20 |
| Copper oxide | 1–20 | a temperature of 120 degrees is obtained and this temperature is held over a considerable period of time. In this mixture chemical heat is generated by the oxidation of the magnesium metal by the potassium chlorate and the copper oxide. In this formula any chlorate or perchlorate can be used in place of the potassium chlorate, but the potassium chlorate or perchlorate is to be preferred since it is substantially insoluble in water and will not dissolve in case excess water is applied to the mixture. In case a soluble chlorate such as sodium chlorate is used in the formula, more care must be used in applying the water since an excess of water will dissolve the chlorate, thereby weakening the reaction. This is a two stage heating reaction involving the oxidation of the magnesium metal. First, the magnesium reacts with the potassium chlorate in the presence of copper oxide as a catalyst. After sufficient heat is developed the copper oxide begins to react with the magnesium giving a larger amount of heat. It will be obvious that any oxidizing agent may be used in place of the potassium chlorate or perchlorate and any metallic oxide may be substituted for the copper oxide.

It will be noted that here, as well as in other formulas disclosed in this specification, that the temperature will be practically the same, whether a container using this formula is slightly dampened with water, or other liquid catalytic agent, or whether it is saturated.

Several other formulas may be used which give excellent results, the following more important ones are.

| | Parts |
|---|---|
| Potassium chlorate or perchlorate | 1–25 |
| Zinc chloride (or any chloride) | 0.02–10 |
| Magnesium metal | 0.1–10 |

The following formula for a two stage heating reaction may be used.

| | Parts |
|---|---|
| Iron oxide | 1–5 |
| Aluminum oxide | 1–5 |
| Magnesium | 0.1–10 |
| Potassium chlorate (or any other oxidizing material) | 1–5 |

The above formula includes two amphoteric metallic compounds, i. e. aluminum oxide and iron oxide (ferric preferably). In this formula the first reaction is between the potassium chlorate and the aluminum and iron combination, known as iron aluminate. When the potassium chlorate is exhausted the oxidation occurs by reducing the iron oxide to iron and oxidizing the magnesium to magnesium oxide. When an iron compound is added to any chemical mixture where oxidation occurs, the iron oxide is eventually an oxidizing agent and two stage heating processes occur. In the above formula the aluminum oxide can be omitted in which case not less than one part of magnesium would have to be used.

The following formula involves a two stage heating reaction in which the magnesium is first oxidized by the potassium chlorate and finally by the iron oxide, by reduction to iron metal.

| | Parts |
|---|---|
| Iron oxide | 1–7 |
| Potassium chlorate | 1–7 |
| Magnesium metal | 1–7 |
| Salt | 0.1–20 |

In using the above formula it is usually preferable to use a halogen salt or a halogen salt of an alkali metal.

Another type of reaction which I find very satisfactory is a reaction in which a less active metal is displaced from a compound by the greater affinity of a more active metal, when the mixture is treated with water or other liquid catalytic agent.

A mixture of this type would be

| | Parts |
|---|---|
| Copper oxide | 1–25 |
| Copper acetate | 0.1–25 |
| Magnesium | 0.1–25 |

Such a mixture when treated with water or other liquid medium will develop a temperature of 97 degrees centigrade and will maintain this temperature for a considerable period of time.

The mixture just disclosed is a two stage heating process. In the first step, magnesium reacts with copper acetate liberating heat. When the heat has reached a considerable temperature the copper oxide begins to oxidize the remainder of the magnesium, liberating a still greater amount of heat.

Other types of two stage heating methods are those in which an active metal and a relatively less active metal react with the active chemicals. In reactions of this type the more active metal reacts first with the chemical present and the heat generated by this reaction starts the reaction between the chemical and the less active metal.

Such a mixture would be

| | Parts |
|---|---|
| Magnesium | 1–10 |
| Aluminum | 1–4 |
| Copper acetate | 1–25 |

In this reaction, first magnesium reacts with the copper acetate, liberating heat, this heat causes the aluminum to begin to displace the copper in the copper acetate, liberating a still greater amount of heat.

In the use of a two stage reaction, larger amounts of heat are released and a much prolonged heating time is obtained. Such a mixture may consist of a metal and a more active metal, mixed with the active chemicals, or it may consist of two chemicals, one more active and the other less active.

In all the formulas, herein disclosed, attention is called to the fact that water does not go into reaction but acts simply as a liquid catalytic agent.

Although the methods of producing heat by chemical means which are disclosed in this application may be used in many arts, they are particularly applicable to the cosmetic art, especially when applied in conjunction with a special pad of the type disclosed in the accompanying drawing. In this drawing, like characters of reference refer to like parts throughout the several views.

Figure 1:
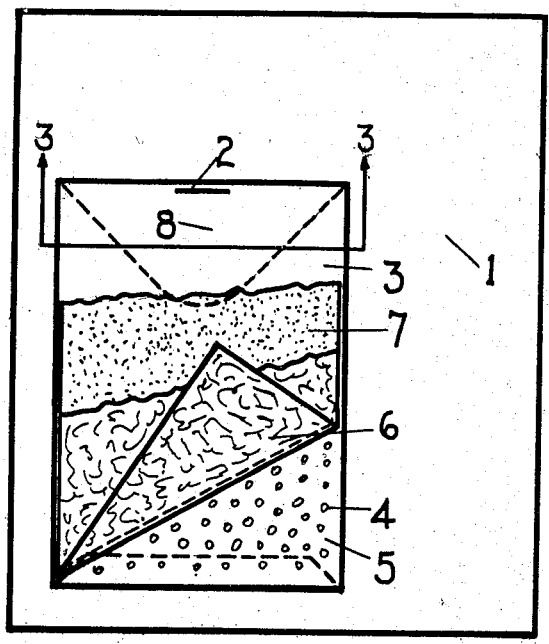
Fig. 1 represents an inside plan view of the preferred embodiment of the pad in its unwrapped condition. In this view the envelope is shown broken away, the inner absorbent pad folded back, and the chemicals which are placed on this absorbent pad are shown broken away.

The outer wrapper of the hair waving pad is denoted by (1) and is preferably made of non-absorbent material, as for instance paper. Attached to the outer wrapper (1) by means of a clip or similar object (2) is an envelope (3) of impervious non-soluble material which is supplied with a plurality of holes (4) on its face (5).

Inside the envelope (3) and placed next to the perforated side of the envelope is a pad (6) of absorbent material such as cotton. Next to the pad (6) is placed the chemical or chemicals (7) which when placed in contact with a catalytic agent will generate sufficient heat to impart a so called permanent wave to a preformed tress of hair when enclosed in the pad. The outer face of the envelope (3) is referred to by the numeral (8).

Figure 2:
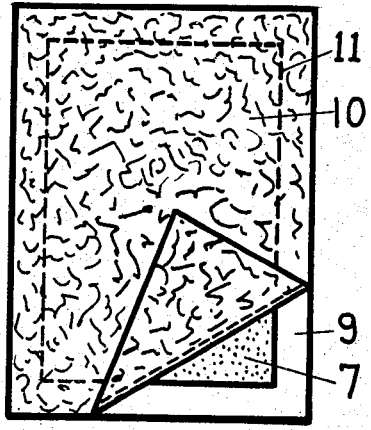
Fig. 2 represents a modified form of the invention in which the outer absorbent pad is folded back. In this case the pad is shown detached from its outer wrapper which is of the same form as that disclosed in Fig. 1.
Figure 3:
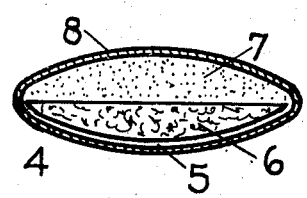
Fig. 3 is a sectional view of the preferred form of the pad with the outer wrapper omitted. This section is taken along the line 3—3, Fig. 1.

In the modified form of the pad shown in Fig. 2 the wrapper (1) is not shown although in this form of the pad it is normally used in the same manner as in the form of the pad illustrated in Fig. 1. In this pad no envelope is used but a sheet of non-soluble impervious material (9) such as paper or tinfoil is sewed, glued, or otherwise fastened to a sheet of absorbent material (10). The means for fastening the absorbent material to the back of the pad is referred to by the numeral (11). The chemical means used in this form of the pad are the same as those used in the preferred form of the pad and are referred to by the numeral (7).

Figure 4:
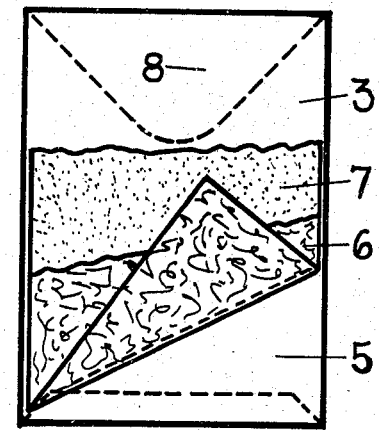
Fig. 4 represents a further modified form of the pad in which an unperforated envelope is used. In this case the outer envelope is broken away, the absorbent pad is folded back, and a portion of the chemicals is removed.
Figure 5:
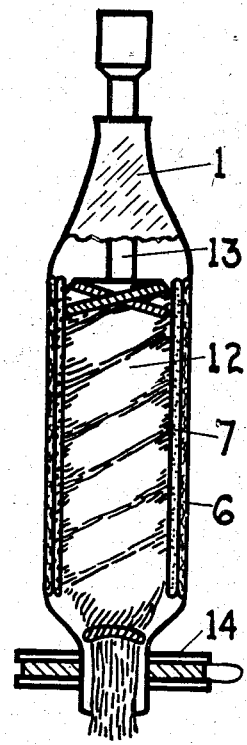
Fig. 5 represents a longitudinal central section through the wrapped pad in place on a preformed tress of hair.

The form of the pad shown in Fig. 4 is the same as that shown in Fig. 1 except the wrapper (1) has been omitted and back face (5) of the pad is unperforated. The numerals used in this figure are, therefore, the same as those used in Fig. 1.

In practice, the tress of hair (12) is wound as usual on a mandrel (13) in case a spiral form of wave is desired. In case a Croquignole wave is desired a different form of mandrel (not shown) is used. When this form of wave is desired it is usually desirable to remove the outer wrapper (1) from the pad before applying the pad to the hair. With either form of wave the hair may be wetted with a suitable waving solution such as, for instance, an ammonium solution, either before or after it is wound on the mandrel. The pad is then wrapped around the preformed tress and is preferably secured in position at the scalp end of the tress by a suitable scalp protecting guard of well known, or approved form, such as the self-locking guard (14) shown in the accompanying drawing. The outer end of the pad may be secured around the mandrel (13) as, for instance, by twisting the outer wrapper of the pad around the same. It will be noted that the pad may be filled with the conventional heating chemicals now used in the art. It is preferable, however, to use the displacement form of reaction of the type disclosed and claimed in this application.

Figure 6:
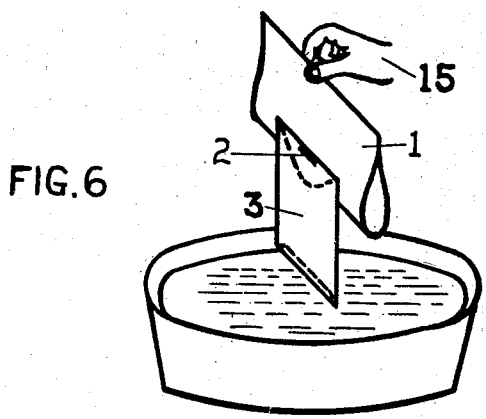
Fig. 6 is a perspective view of the method by which the pad is wetted without wetting the hands of the operator.

The best method of wetting the pad is illustrated in Fig. 6 in which figure the wrapper (1) is shown folded back so that the pad may be lowered in the liquid reagent without getting any liquid on the wrapper (1) or the operator's hand (15). After the pad is wetted in this manner, the liquid reagent will at once soak through the perforations (4) in the envelope (3), if the preferred form of the pad is used, and wet the absorbent pad (6), this pad will in turn wet the chemicals (7) and start the heat-liberating reaction. If the form of the pad shown in Fig. 2 is used the absorbent will be wet very thoroughly immediately upon insertion in the liquid reagent (16) since in this form of pad the absorbent material is exposed directly to the liquid. If the form of the pad shown in Fig. 4 is used the back face (5) of the envelope must be punctured, preferably before the pad is dipped in the liquid reagent.

It will be obvious, whatever form of pad is used, that either the liquid reagent or the chemical or chemicals in the pad may be treated to produce the results heretofore set forth. After the pad has been dipped in the liquid reagent a regular heat is then set up within the pad in order to impart a so called permanent wave to the preformed tress without requiring the application of heat from an outside source. It will be seen that when the spiral form of wave is made (in which case the wrapper (1) is not removed from the pad) the outside wrapper of the pad serves to confine the heat to a large extent within the pad, the steam generated by the combination of the treating solution with the chemical being permitted to escape through the crimped outer end of the outer wrapper.

Having thus fully disclosed my invention, what I claim is:

A heat producing composition adapted upon contact with water to produce heat sufficient in quantity and correct in time to permanently wave hair, comprising substantially equal parts of copper acetate and copper oxide and finely divided metallic magnesium in amount sufficient to successively react with the copper acetate and the copper oxide.

CARL J. LEWIT.